United States Patent
Bendlin et al.

(10) Patent No.: US 11,627,519 B2
(45) Date of Patent: Apr. 11, 2023

(54) DISCONTINUOUS ACCESS TO UNLICENSED SPECTRUM IN A NEW RADIO ENVIRONMENT

(71) Applicant: AT&T Intellectual Property I, L.P., Atlanta, GA (US)

(72) Inventors: Ralf Bendlin, Cedar Park, TX (US); Aditya Chopra, Austin, TX (US); Arunabha Ghosh, Austin, TX (US); Abdulrauf Hafeez, Cary, NC (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/808,156

(22) Filed: Jun. 22, 2022

(65) Prior Publication Data

US 2022/0322217 A1 Oct. 6, 2022

Related U.S. Application Data

(63) Continuation of application No. 17/065,200, filed on Oct. 7, 2020, now Pat. No. 11,399,336, which is a continuation of application No. 16/573,332, filed on Sep. 17, 2019, now Pat. No. 10,834,667, which is a continuation of application No. 16/277,284, filed on Feb. 15, 2019, now Pat. No. 10,455,488.

(51) Int. Cl.
*H04W 4/00* (2018.01)
*H04W 48/16* (2009.01)
*H04W 4/70* (2018.01)
*H04W 16/14* (2009.01)

(52) U.S. Cl.
CPC ............. *H04W 48/16* (2013.01); *H04W 4/70* (2018.02); *H04W 16/14* (2013.01)

(58) Field of Classification Search
CPC ....... H04W 48/16; H04W 4/70; H04W 16/14; H04W 56/00; H04W 72/04; H04W 4/00
USPC .............................. 455/434, 450, 452.1, 509
See application file for complete search history.

(56) References Cited

U.S. PATENT DOCUMENTS 9,237,453 B2   1/2016   Steer et al.
9,363,743 B2   6/2016   Xue et al.
(Continued)

OTHER PUBLICATIONS

Notice of Allowance received for U.S. Appl. No. 16/277,284 dated Jun. 18, 2019, 36 pages.
(Continued)

*Primary Examiner* — Marceau Milord
(74) *Attorney, Agent, or Firm* — Amin, Turocy & Watson, LLP

(57) ABSTRACT

Discontinuous access to unlicensed spectrum is facilitated in a new radio access environment. According to an embodiment, a system can comprise performing a scanning procedure that determines whether a first subband and a second subband is available for transmission. The system can further facilitate determining whether the first subband and the second subband are adjacent, wherein a first channel formed at the first subband comprising a first guard band and a second channel formed at the second subband comprising a second guard band that is adjacent to the first guard band. The system can further facilitate in response to determining that the first subband and the second subband are adjacent and available for transmission, eliminating the first guard band and the second guard band.

20 Claims, 11 Drawing Sheets

(56) References Cited

U.S. PATENT DOCUMENTS

| | | | |
|---|---|---|---|
| 9,686,780 B2 | 6/2017 | Ye et al. | |
| 9,693,235 B2 | 6/2017 | Agardh et al. | |
| 9,699,804 B2 | 7/2017 | Wong et al. | |
| 9,867,054 B2 | 1/2018 | Zhang et al. | |
| 9,986,574 B2 | 5/2018 | Xia et al. | |
| 10,028,162 B2 | 7/2018 | Wang et al. | |
| 10,091,808 B2 | 10/2018 | Bergstöm et al. | |
| 10,098,016 B2 | 10/2018 | Wang et al. | |
| 10,129,870 B2 | 11/2018 | Li et al. | |
| 10,314,082 B2 | 6/2019 | Akoum et al. | |
| 10,397,915 B2 | 8/2019 | Hosseini et al. | |
| 10,455,488 B1* | 10/2019 | Bendlin | H04W 48/16 |
| 10,834,667 B2* | 11/2020 | Bendlin | H04W 16/14 |
| 11,399,336 B2* | 7/2022 | Bendlin | H04W 16/14 |
| 2008/0049708 A1* | 2/2008 | Khan | H04B 1/713 |
| | | | 375/E1.033 |
| 2009/0116374 A1 | 5/2009 | Henriksson et al. | |
| 2012/0236776 A1* | 9/2012 | Zhang | H04W 48/20 |
| | | | 370/312 |
| 2013/0077551 A1 | 3/2013 | Lo et al. | |
| 2013/0324050 A1 | 12/2013 | Gutierrez et al. | |
| 2014/0080475 A1 | 3/2014 | Gholmieh et al. | |
| 2014/0274103 A1 | 9/2014 | Steer et al. | |
| 2015/0085677 A1 | 3/2015 | Pourahmadi et al. | |
| 2015/0215910 A1* | 7/2015 | Han | H04W 56/0045 |
| | | | 370/329 |
| 2015/0245232 A1* | 8/2015 | Luo | H04W 24/08 |
| | | | 370/252 |
| 2016/0105843 A1 | 4/2016 | Xue et al. | |
| 2016/0219440 A1 | 7/2016 | Wang | |
| 2016/0381589 A1* | 12/2016 | Zhang | H04L 5/001 |
| | | | 370/252 |
| 2017/0064702 A1* | 3/2017 | Li | H04W 74/0816 |
| 2018/0132235 A1 | 5/2018 | Hosseini et al. | |
| 2018/0263048 A1 | 9/2018 | Ingale et al. | |
| 2018/0376341 A1 | 12/2018 | Khoshnevisan et al. | |
| 2019/0327124 A1* | 10/2019 | Lai | G01S 11/02 |
| 2019/0380129 A1 | 12/2019 | Hosseini et al. | |

OTHER PUBLICATIONS

Non-Final Office Action received for U.S. Appl. No. 16/573,332 dated May 15, 2020, 76 pages.

Non-Final Office Action received for U.S. Appl. No. 17/065,200 dated Dec. 9, 2021, 55 pages.

U.S. Appl. No. 17/065,200, filed Oct. 7, 2020.

U.S. Appl. No. 16/573,332, filed Sep. 17, 2019.

U.S. Appl. No. 16/277,284, filed Feb. 15, 2019.

* cited by examiner

DISCONTINUOUS ACCESS TO UNLICENSED SPECTRUM IN A NEW RADIO ENVIRONMENT

RELATED APPLICATIONS

The subject patent application is a continuation of, and claims priority to each of, U.S. patent application Ser. No. 17/065,200, filed Oct. 7, 2020 and entitled "DISCONTINUOUS ACCESS TO UNLICENSED SPECTRUM IN A NEW RADIO ENVIRONMENT," which is a continuation of U.S. patent application Ser. No. 16/573,332 (now U.S. Pat. No. 10,834,667), filed Sep. 17, 2019 and entitled "DISCONTINUOUS ACCESS TO UNLICENSED SPECTRUM IN A NEW RADIO ENVIRONMENT," which is a continuation of U.S. patent application Ser. No. 16/277,284 (now U.S. Pat. No. 10,455,488), filed Feb. 15, 2019 and entitled "DISCONTINUOUS ACCESS TO UNLICENSED SPECTRUM IN A NEW RADIO ENVIRONMENT," the entireties of which priority applications are hereby incorporated by reference herein.

TECHNICAL FIELD

This disclosure relates generally to a wireless communication system in general, and to a fifth generation (5G) wireless communication systems that utilizes licensed and unlicensed spectrum. More specifically, facilitating a discontinuous access to unlicensed spectrum.

BACKGROUND

5th generation (5G) wireless systems represent a next major phase of mobile telecommunications standards, also called new radio (NR) access, beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating a discontinuous access to unlicensed spectrum in a new radio access environment is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
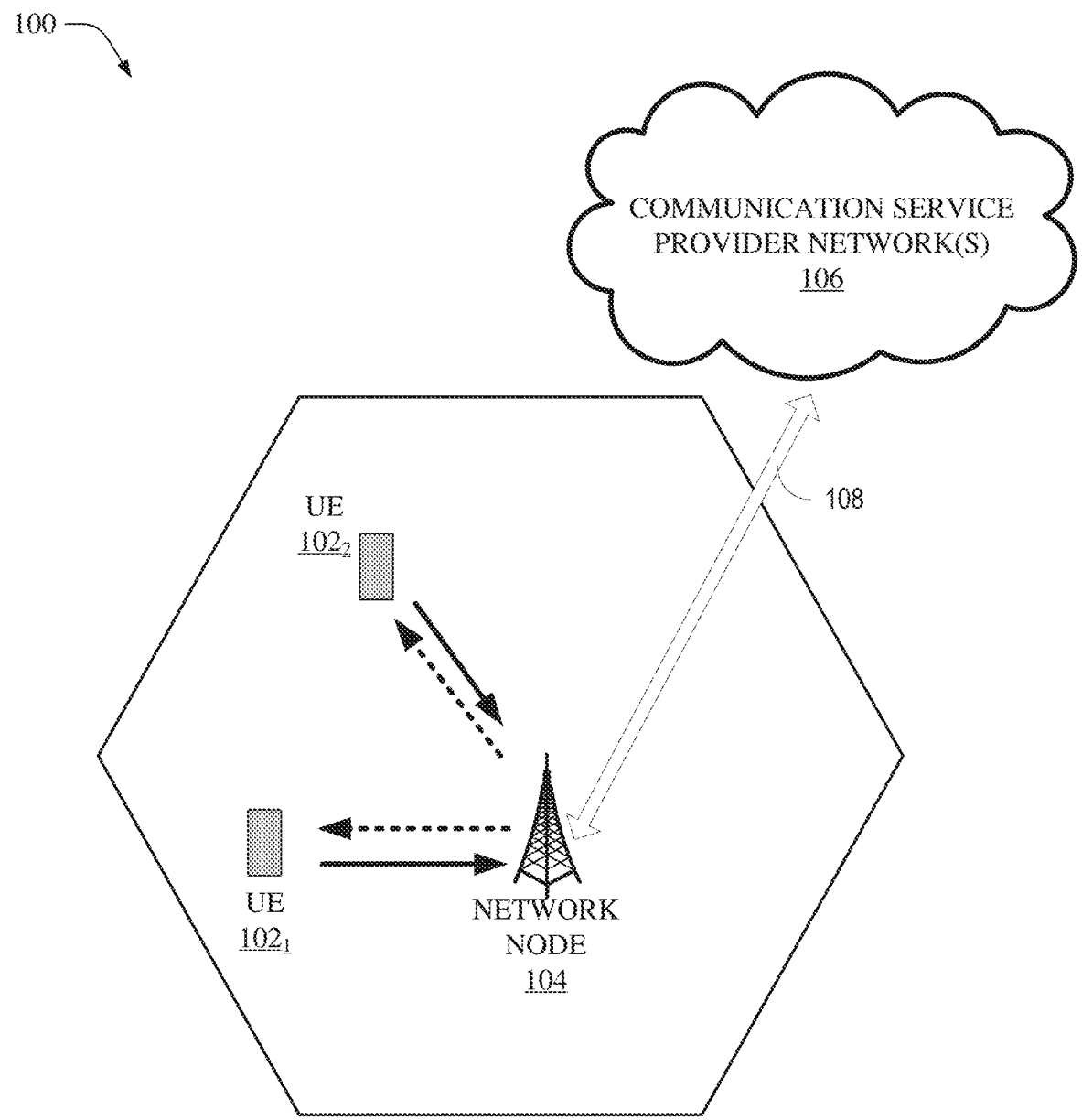
FIG. 1 illustrates an example wireless communication system in which a network node device (e.g., network node) and user equipment (UE) can implement various aspects and embodiments of the subject disclosure

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a discontinuous access to unlicensed spectrum in a new radio access environment. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate a discontinuous access to unlicensed spectrum in a new radio access environment. Facilitating a discontinuous access to unlicensed spectrum can be implemented in connection with any type of device with a connection to the communications network (e.g., a mobile handset, a computer, a handheld device, etc.) any Internet of things (JOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

Wireless local area networks (WLANs) have long been deployed in unlicensed spectrum bands. The IEEE 802.11 communications standard is an example of a communications system operating in these bands. A popular implementation thereof, for example, is Wi-Fi. Numerous versions of the Wi-Fi standard have been developed and deployed over the years such as 802.11a/b/g/n/ac/ax. One characteristic of this evolution is the ever increasing bandwidth these communications standards can offer. For example, IEEE 802.11a started out with 20 MHz bandwidth whereby the latest generation, Wi-Fi 6 or 802.11ax, can access up to 160 MHz. The standards associated with Wi-Fi (e.g., all versions) define how devices can transmit using unlicensed spectrum. A device operating using Wi-Fi, first listens on the portion of the subband (e.g., a subbands of 20 MHz) until there is no traffic before transmitting using that subband (e.g., also referred to as "sensing" or "scanning"). The sensing before transmitting applies to transmission on both uplink and downlink. Sensing is a method for checking for energy on a given subband during a time-slot. In particular, an energy detection threshold is defined per said LBT subband and whether the medium is occupied or idle is determined per LBT subband based on whether the measurement results in a value larger or smaller than said detection threshold. If for a given subband, the threshold is exceeded, it is considered occupied or busy; otherwise, it is considered idle (e.g., available to transmit for a predefined timeframes/timeslots, for example, ten timeslots).

Due to the unlicensed or lightly licensed nature of the spectrum in question, devices operating in these bands must share the resources in a way that ensures fair coexistence among them regardless of their radio access technology (RAT). This is achieved by clear channel assessment (CCA) prior to a device's transmission. This procedure is often referred to as Listen-Before-Talk (LBT) since prior to any transmission the device first listens whether the channel is occupied by measuring the received power across a predetermined bandwidth. It only commences a transmission (or talks) when said received power is below a certain threshold thereby guaranteeing that its own transmission does not cause any harmful interference.

While new generations of each communications standard have brought forward ever-increasing transmission bandwidths, the sensing has remained basically unchanged. Even the latest generation of Wi-Fi devices still senses on the original bandwidth of 20 MHz supported by the original version 802.11a. This is because legacy devices are still in operation such that sensing on a wide bandwidth that is occupied by a narrowband device may not trigger the medium to be occupied resulting in unwanted interference from the wideband device towards the narrowband device occupying the channel. Hence, even for devices that support wide bandwidths much larger than 20 MHz, the sensing is performed in units of 20 MHz (described more in FIG. 2). Assume a base station is capable of supporting a very large bandwidth 220 with a single serving cell. According to the above, said base station may perform physical sensing for the purpose of clear channel assessment in chunks of 20 MHz subbands (e.g., 202, 204, 206, and 208 of FIG. 2). In particular, an energy detection threshold is defined per said LBT subband and whether the medium is occupied or idle is determined per LBT subband based on whether the measurement results in a value larger or smaller than said detection threshold. If for a given subband the threshold is exceeded, it is considered occupied or busy; otherwise, it is considered idle.

The Long-Term Evolution (LTE) communications standard of the Third Generation Partnership project (3GPP) in its Release #13 introduced a feature called LTE licensed assisted access (LTE-LAA) that allows 3GPP LTE devices to operate on unlicensed bands whereby such access is controlled from a licensed carrier. LTE-LAA is based on the LTE standard for licensed carriers and makes it suitable for unlicensed spectrum through enhancements. LTE-LAA has further been evolved in LTE Releases 14 and 15. In Release 16 a New Radio (NR) interface was specified for NR-based access to unlicensed spectrum. It has been developed in Release 15 for licensed bands and has been enhanced in Rel. 16 to also operate in unlicensed spectrum. Unlike LTE-LAA, NR-U (NR-based access to unlicensed spectrum) has two flavors. A non-standalone flavor called LAA that requires a licensed carrier and a standalone one which can be deployed without assistance of a licensed carrier.

The state-of-the-art in LTE-LAA for wideband operation is based on the carrier aggregation (CA) framework. Instead of operating a single serving cell on a single wideband carrier, each LBT subband (e.g., 202, 204, 206 and 208 of FIG. 2) is operated and configured as a separate serving cell or carrier. The primary cell is called the PCell and is operated on the primary component carrier (PCC). In LAA mode, the PCell/PCC is always in licensed spectrum. The remaining cells/carriers are the secondary cells (SCells) and secondary component carriers (SCCs), respectively. The Radio Resource Control (RRC) protocol can configure SCells/SCCs accordingly via signaling on the PCell/PCC. SCCs can be aggregated from both licensed and unlicensed spectrum. For example, a device may be configured with a first plurality of component carriers (CCs) in licensed bands and a second plurality of component carriers (CCs) in unlicensed bands. Through aggregation of these CCs wideband operation can be achieved, however, since each SCC has its own SCell, wideband operation in unlicensed spectrum by means of carrier aggregation requires multiple serving cells.

NR-U supports a similar CA based framework for wideband operation in unlicensed spectrum as LTE does. In addition, NR-U supports wideband operation in unlicensed spectrum with a single serving cell. In LAA mode, a device may still be configured with a plurality of serving cells, however, these serving cells are configured to operate cells on spectrum in both licensed and unlicensed bands. In an example, a device may be RRC configured with multiple serving cells in licensed bands and a single wideband serving cell in unlicensed spectrum. In other words, even though carrier aggregation is used, it is not used to aggregate cells in unlicensed spectrum. A single wideband serving cell is operated in unlicensed spectrum and the carrier aggregation simply aggregates said wideband serving cell in unlicensed spectrum with additional serving cells in licensed spectrum.

In standalone mode, no CA is needed and a single wideband serving cell can be operated in unlicensed spectrum spanning multiple LBT subbands.

NR-U specifies a third mode called dual connectivity (DC). Similar to LAA, serving cells in both licensed and unlicensed spectrum are aggregated. However, in addition to one PCell and a single plurality of SCells, the serving cells are split into two cell groups: a primary cell group (PCG) comprising the PCell and a first plurality of SCells and a secondary cell group (SCG) comprising a special primary SCell (pSCell) and a second plurality of SCells. The pSCell of the SCG functions similarly to the PCell of the MCG and together with the PCell, PCell and pSCell are called special cells. In the DC mode of NR-U, the MCG is operated in licensed spectrum whereby the SCG is operated in unlicensed spectrum. Wideband operation in unlicensed spectrum can then be achieved by means of multiple CCs in the SCG where each CC spans a single LBT subband or by means of a single wideband serving cell, i.e., the SCG only comprises the pSCell.

It should be understood that further variations can be conceived, for example, but not limited to, combinations where CCs span more than one LBT subband and the SCG comprises more than one SCell at least one of which spans more than one LBT subband. Generally speaking, wideband operation is defined by at least one serving cell spanning at least two LBT subbands regardless of SA, LAA or DC mode.

3GPP defines RF requirements based on the concept of carriers. For example, a spectral mask may be defined for each carrier defining how much power is allowed to leak from transmissions within the defined carrier to frequencies outside the defined carrier. A popular metric for such out-of-band emissions (OOBE) is the Adjacent Channel Leakage Ratio (ACLR). Based on such spectral masks, filters can be designed and implemented that ensure transmissions within a certain carrier fulfil requirements with respect to adjacent channel leakage and out-of-band emissions. For example, two adjacent bands may be licensed to two operators that operate their networks in these bands independently. As long as all devices operating in each band fulfil specified requirements such as the spectral mask, no harmful interference is created among the two operators. Since the respective adjacent bands are licensed to each operator, they are static as are the filters ensuring the spectral masks are complied with.

Figure 3:
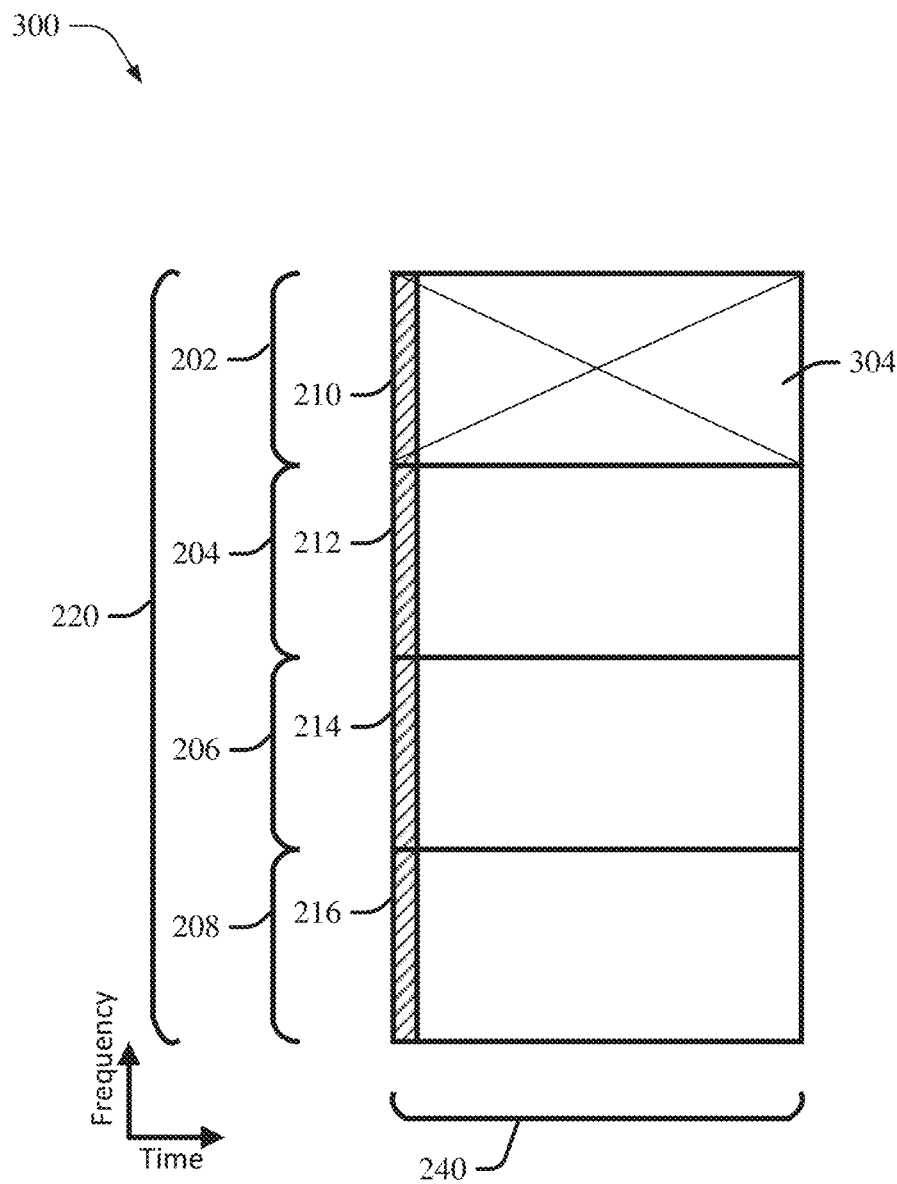
FIG. 3 illustrates an example of a NR with single serving cell in an unlicensed spectrum in accordance with various aspects and embodiments described herein.
Figure 4:
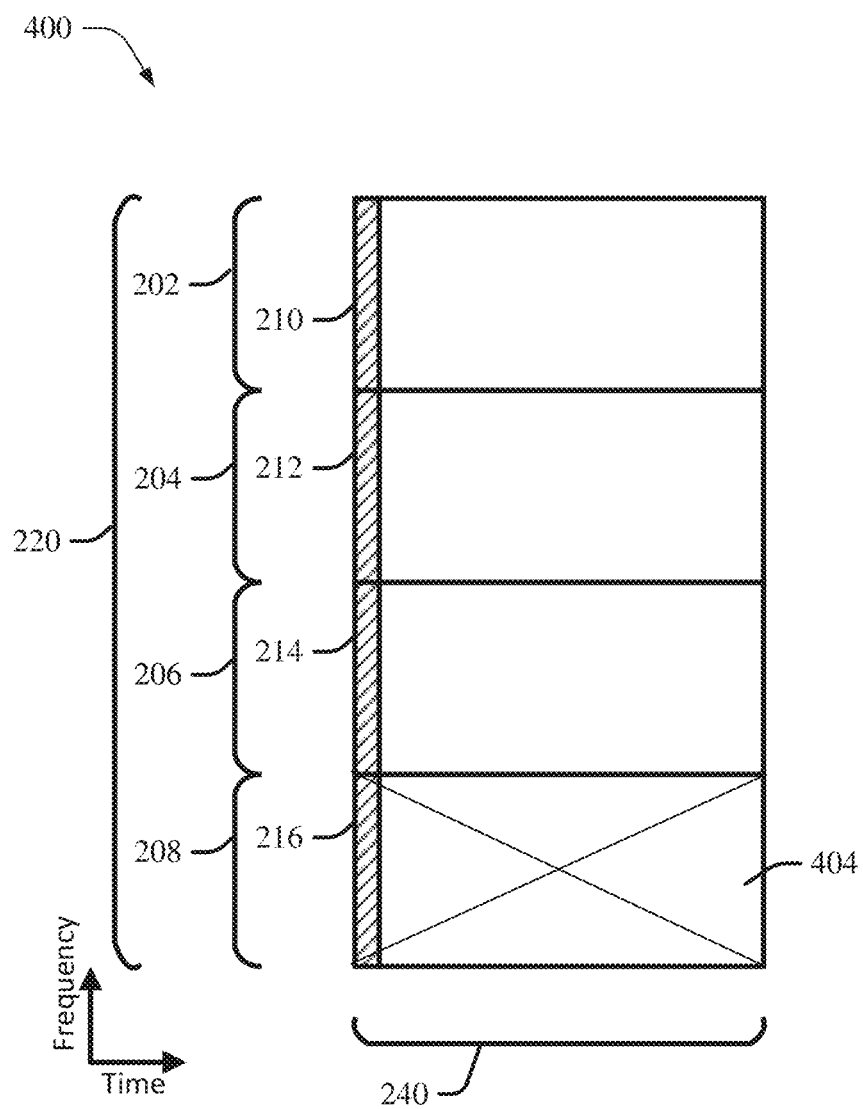
FIG. 4 illustrates an example of a NR with single serving cell in an unlicensed spectrum in accordance with various aspects and embodiments described herein.
Figure 5:
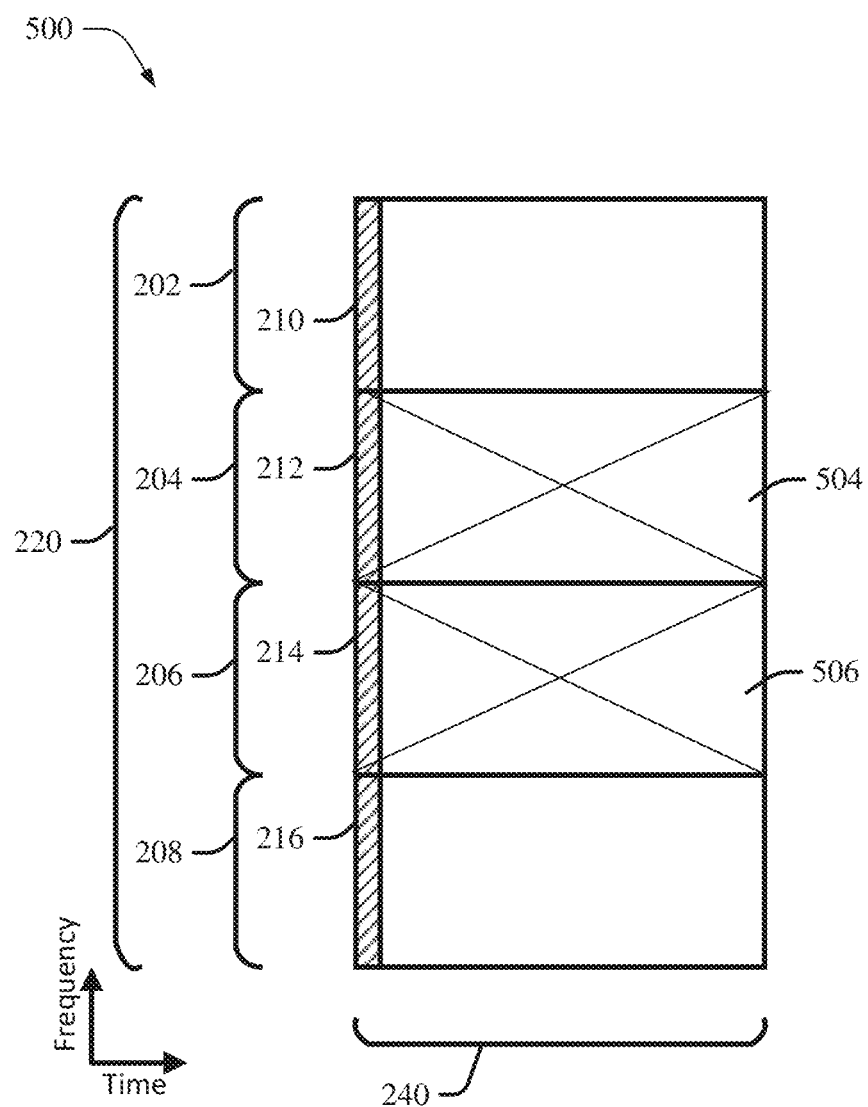
FIG. 5 illustrates an example of a NR with single serving cell in an unlicensed spectrum in accordance with various aspects and embodiments described herein.

In unlicensed spectrum, however, the situation is different. First, narrowband devices coexist with wideband devices. For example, legacy devices of an earlier communications standard may use 20 MHz transmission bandwidth whereas new devices of the latest communications standard use up to 160 MHz transmission bandwidth. Secondly, due to the channel access procedure, such legacy and new devices access the shared channels opportunistically. In a first time instance, a first device may transmit with 20 MHz bandwidth and in a second time instance a second device may transmit with 160 MHz bandwidth. This is exemplified in FIG. 3, FIG. 4 and FIG. 5 below. In FIG. 3, a narrowband device occupies subband 202 (e.g., 304) while subbands 204, 206 and 208 are idle. In FIG. 4, a narrowband device occupies subband 208 (e.g., 404) while subbands 202, 204 and 206 are idle. In FIG. 5, a narrowband device occupies subbands 204 and 206 (e.g., 504 and 506) while subbands 202 and 208 are idle.

If the carrier aggregation framework is used whereby each subband 202, 204, 206 and 208 are operated as an independent carrier with its own serving cell, such dynamicity is not an issue because spectral masks are defined per carrier, i.e., transmissions on an occupied carrier (LBT subband respectively) will not leak power into adjacent idle subbands similar to the example of two operators using two adjacent carriers in the example above. If, however, a single serving cell/carrier 220 is used in FIG. 3, FIG. 4 and FIG. 5, then RF leakage and blockage become an issue because spectral masks are traditionally defined per carrier, i.e., in this case for the entire bandwidth spanning all four subbands 202, 204, 206 and 208 (namely the bandwidth of the carrier 220). In some embodiments disclosure proposes apparatus and methods to allow discontinuous transmissions in a wideband carrier whereby the gaps creating the discontinuous transmissions in frequency domain result from narrowband transmitters occupying the spectrum in said gaps in an uncoordinated manner.

In some embodiments, a device can comprise a processor and a memory that stores executable instructions that, when executed by the processor, facilitate performance of operations comprising a discontinuous access to unlicensed spectrum in a new radio access environment. In some embodiments, apparatus and methods are disclosed to facilitate to indicate to the receiver which subbands are occupied by the intended transmitter and which subbands are not occupied by the intended transmitter. Based on this information the receiver can set its RF and digital filters accordingly to prevent RF leakage and blockage. The indication can be per subband or for all subbands in a single indication. The indication can be per device or for all devices connected to a base station. Moreover, different scheduling schemes are proposed to allow the receiver sufficient processing time to adapt its RF and digital filters between two indications. Wideband operation with a single serving cell or with fewer serving cells as in the case where each subband is a separate serving cell has the following benefits: less signaling overhead from the reduced number of serving cells; and less guard bands in frequency domain because adjacent subbands that are idle no longer require guards in frequency to separate them.

According to an embodiment, a system can comprise a processor and a memory that stores executable instructions that, when executed by the processor, facilitate performance of operations comprising performing a scanning procedure that determines whether a first subband and a second subband is available for transmission. The system can further facilitate determining, whether the first subband and the second subband are adjacent, wherein a first channel formed at the first subband comprising a first guard band and a second channel formed at the second subband comprising a second guard band. The system can further facilitate in response to determining that the first subband and the second subband are adjacent and available for transmission, eliminating the first guard band and the second guard band.

According to another embodiment, described herein is a method that can comprise scanning, by a device comprising a processor, to determine whether a first subband and a second subband are idle? The method can further comprise determining, by the device, whether the first subband and the second subband are adjacent, wherein a first channel formed within the first subband comprising a first guard band and a second channel formed within the second subband comprising a second guard band that is adjacent to the first guard band. The method can further comprise in response to the first subband and the second subband being determined to be adjacent and idle, eliminating, by the device, the first guard band and the second guard band.

According to yet another embodiment, machine-readable storage medium, comprising executable instructions that, when executed by a processor, facilitate performance of operations, performing a scanning procedure that determines whether a first subband and a second subband contains an energy level below a threshold. The machine-readable storage medium can further comprise determining whether the first subband and the second subband are adjacent, wherein a first channel formed at the first subband comprising a first guard band and a second channel formed at the second subband comprising a second guard band that is adjacent to the first guard band. The machine-readable storage medium can further comprise in response to determining that the first subband and the second subband are adjacent and determining that the energy level is below the threshold, eliminating the first guard band and the second guard band.

These and other embodiments or implementations are described in more detail below with reference to the drawings.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
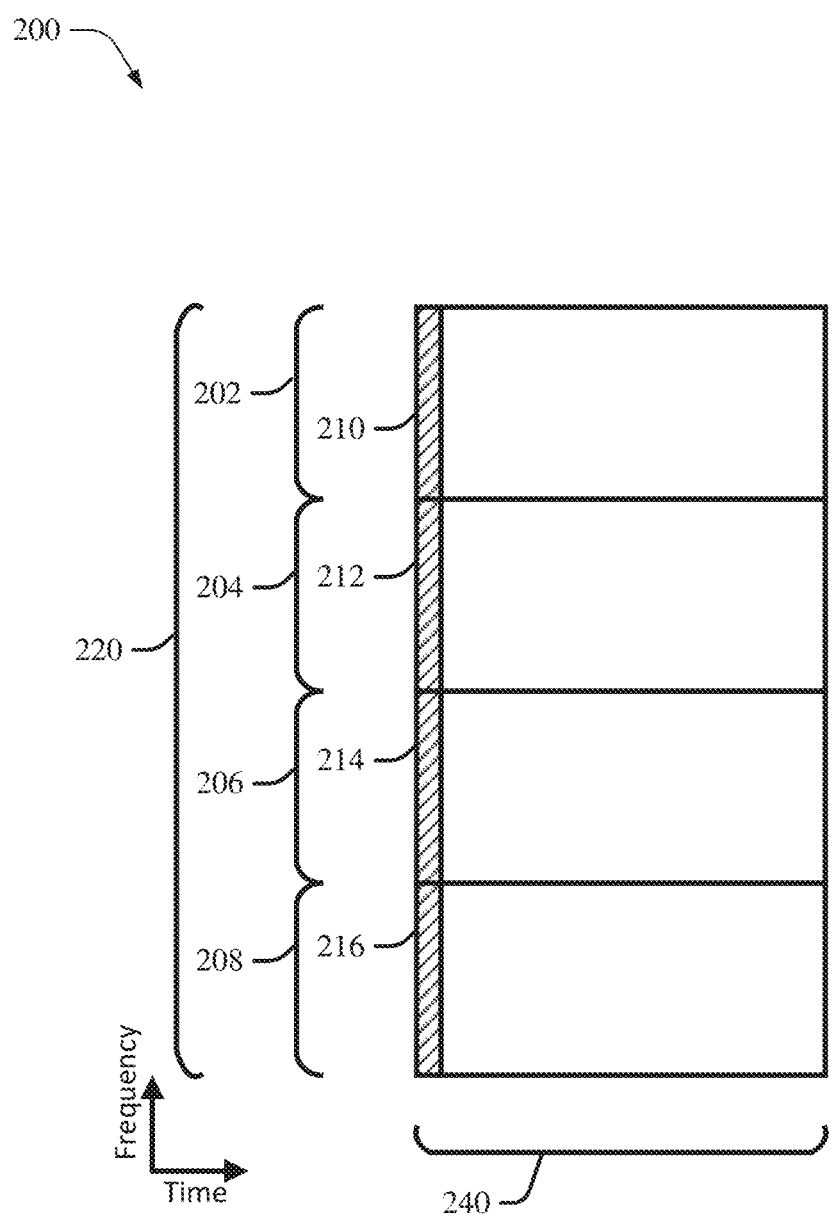
FIG. 2 illustrates an example of a NR with single serving cell in an unlicensed spectrum in accordance with various aspects and embodiments described herein.

Referring now to FIG. 2, illustrated is an example of a NR with single serving cell in an unlicensed spectrum 200 in accordance with various aspects and embodiments described herein. Repetitive description of like elements employed in other embodiments described herein is omitted for sake of brevity. In some embodiments, a user equipment (UE) is configured with carrier 220 (e.g., a single serving carrier/cell) and multiple Control Resource Sets (CORESETs) and search spaces such that it monitors for potential Physical Downlink Control Channel (PDCCH) transmissions 210, 212, 214 and 216 in each LBT subband 202, 204, 206 and 208. In an Orthogonal Frequency Division Multiple Access (OFDMA) system such as the Third Generation Partnership Project (3GPP) New Radio (NR) wireless communications standard, the UE may, for example, monitor for PDCCH transmissions per subband 210, 212, 214 and 216 according to the above configured CORESETs and search spaces at every OFDM symbol boundary 240. Monitoring here comprises either blindly decoding PDCCH candidates, or, alternatively, detecting the PDCCH Demodulation Reference Signal (DMRS). In the latter case, the UE may only decode the PDCCH if it first detects PDCCH DMRS.

Referring now to FIG. 3, illustrated is an example of a NR with single serving cell in an unlicensed spectrum 300 in accordance with various aspects and embodiments described herein. Repetitive description of like elements employed in other embodiments described herein is omitted for sake of brevity. As discussed above, a device may not transmit unless the subband is idle. In some embodiments, as illustrated, subband 202 (e.g., at 304) and for PDCCH channel 210, is not idle. As illustrated, subbands 204, 206 and 208 are idle.

Referring now to FIG. 4, illustrated is an example of a NR with single serving cell in an unlicensed spectrum 400 in accordance with various aspects and embodiments described herein. Repetitive description of like elements employed in other embodiments described herein is omitted for sake of brevity. In some embodiments, as illustrated, subband 208 (e.g., at 404) and for PDCCH channel 216, is not idle and subbands 202, 204 and 206 are idle. Thus, subbands 202, 204 and 206 may be available for transmission by either UE or gNB for uplink or downlink.

Referring now to FIG. 5, illustrated is an example of a NR with single serving cell in an unlicensed spectrum 500 in accordance with various aspects and embodiments described herein. Repetitive description of like elements employed in other embodiments described herein is omitted for sake of brevity. In some embodiments, as illustrated, subbands 204 and 206 (e.g., at 504 and 506) and for PDCCH channels 212 and 214, are not idle and subbands 202 and 208 are idle. Thus, subbands 202 and 208 may be available for transmission by either UE or gNB for uplink or downlink.

Due to the unlicensed nature of the spectrum in consideration, a transmitter may only transmit or occupy a channel after first sensing whether the channel is idle or busy/occupied. If the channel is found idle, the transmitter may occupy the channel up to the maximum channel occupancy time (MCOT). The duration for which the transmitter actually occupies the channel, up to the MCOT, is called the channel occupancy time (COT).

A UE may continuously monitor for PDCCH transmissions on every OFDM symbol (or a subset thereof). When the base station it is connected to is transmitting in its COT, a UE may receive PDCCH transmissions scheduling Physical Downlink Shared Channel (PDSCH) transmission carrying data. A UE may also be indicated that a COT has started by a channel or signal common to all UEs that is transmitted at the beginning of the COT. Without limiting the embodiments herein, and solely for ease of exposition, we will assume a group common PDCCH (GC-PDCCH) can indicate to a UE the beginning of a COT, however, someone skilled in the art can conceive other means. Assumption of a GC-PDCCH thus shall not be construed in a limiting sense. Regardless of whether and how the beginning of a COT is indicated to a UE, when a UE first monitors for a PDCCH or GC-PDCCH, it assumes all transmissions are contained within an LBT subband. This does not mean, all transmissions are contained within a single LBT subband, rather, each transmission is assumed to be contained within a single LBT subband as illustrated in slot 240. This assumption is necessary because for the first transmission of a COT, the UE does not know which LBT subbands 202, 204, 206 or 208 were detected idle at the gNB prior to transmission.

Figure 6:
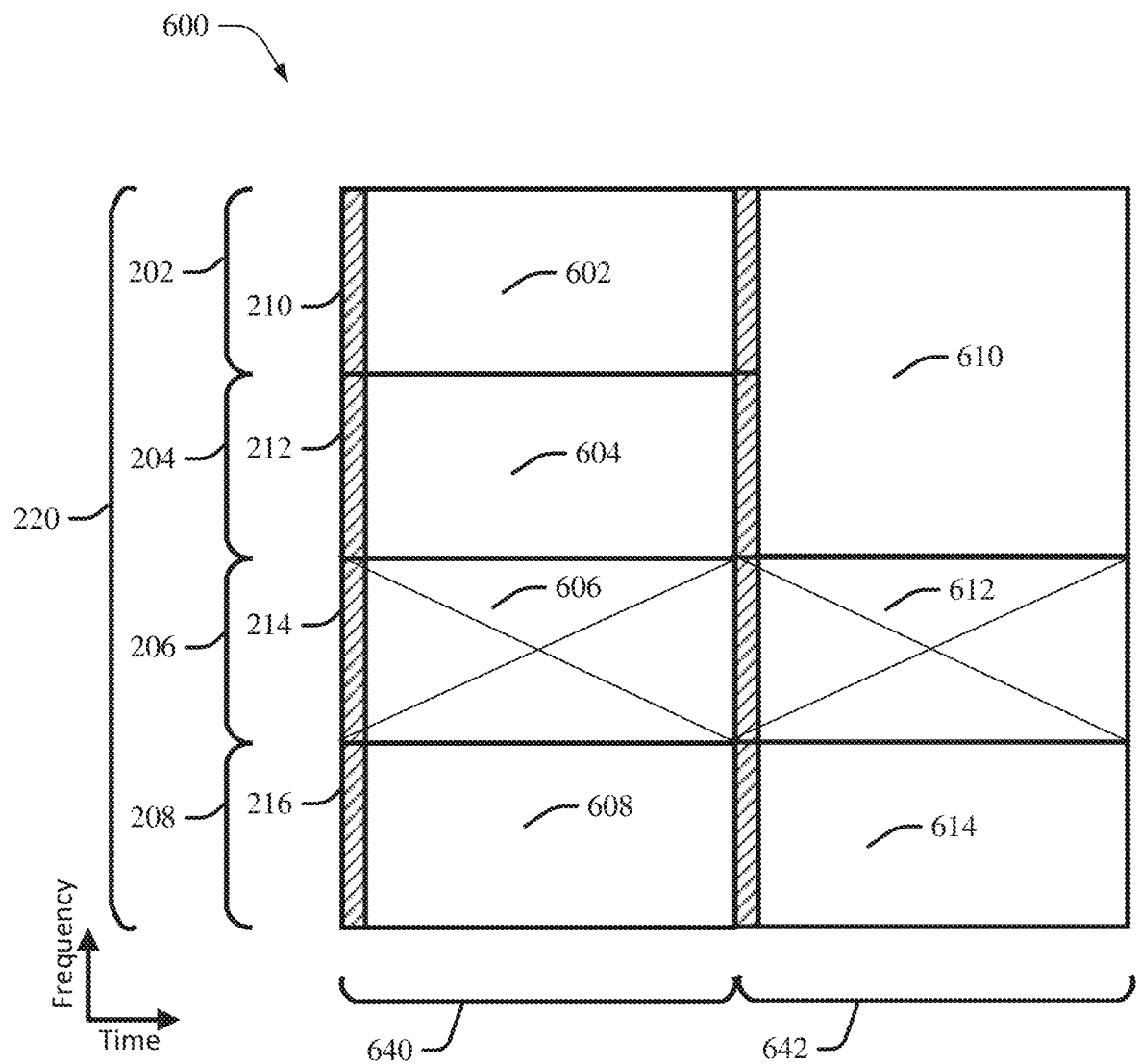
FIG. 6 illustrates an example of a NR with single serving cell in an unlicensed spectrum in accordance with various aspects and embodiments described herein.

Referring now to FIG. 6, illustrated is an example of a NR with single serving cell in an unlicensed spectrum 600 in accordance with various aspects and embodiments described herein. Repetitive description of like elements employed in other embodiments described herein is omitted for sake of brevity. In some embodiments, for time slot 640 the subbands 202, 204 and 208 can be detected as idle whereas subband 206 is detected as busy at the transmitter prior to transmission.

In some embodiments, the UE sets its receive filters such that each LBT subband is isolated from interference outside a given subband. In other words, bandpass filters are used whose passbands correspond to a single LBT subband and whose stopbands cover adjacent LBT subbands. Since perfect rectangular filters are not practically implementable, this requires guards between each LBT subband which cannot be used for transmission of signals or channels. Consequently, the PDCCH and other signals and channels transmitted at the beginning of a COT are mapped to a region in frequency domain smaller than the size of an LBT subband. For example, the size in frequency domain of an LBT subband may be 20 MHZ. Due to the passband filtering per LBT subband at the beginning of a COT, the useful region in frequency domain in which signals and channels can be transmitted may be 90% of that assuming a 5% guard band (discussed in FIG. 7) at each side of the LBT subband.

Given this UE behavior, when the UE first monitors for a PDCCH 210-216 (or a subset thereof) or for a GC-PDCCH (or any other signal or channel) at the beginning of a COT, each transmission is perfectly isolated to within one LBT subband and due to the per LBT subband passband filtering, energy of said transmission does not leak into neighboring LBT subbands that potentially may be occupied by a different transmitter-receiver pair and conversely, energy of transmissions from different transmitter-receiver pairs in adjacent LBT subbands does not leak into the UE's LBT subband where it tries to decode a PDCCH 210-216 (or a subset thereof) or a GC-PDCCH or any other signal or channel. Usage of PDCCH and GC-PDCCH names is for example purposes and should not be construed in a limiting sense.

Since the transmitter cannot know in advance which LBT subbands will be occupied or busy, such a UE behavior also allows the transmitter to prepare each PDCCH, PDSCH or other signal or channel per LBT subband regardless of which LBT subbands will actually be occupied/idle at the time of transmission. In order to not leak energy into adjacent occupied LBT subbands, the transmitter likewise uses passband filters to isolate LBT subbands at the beginning of a COT.

For the second slot 642 in a COT the transmitter has the duration of the first slot 640 to prepare a PDCCH 210-216 (or a subset thereof) or PDSCH or another signal or channel according to the actually occupied LBT subbands in this COT. In some embodiments, in order to avoid unnecessary guard bands between adjacent LBT subbands that are idle, the transmitter and receiver may change their behavior.

Figure 7:
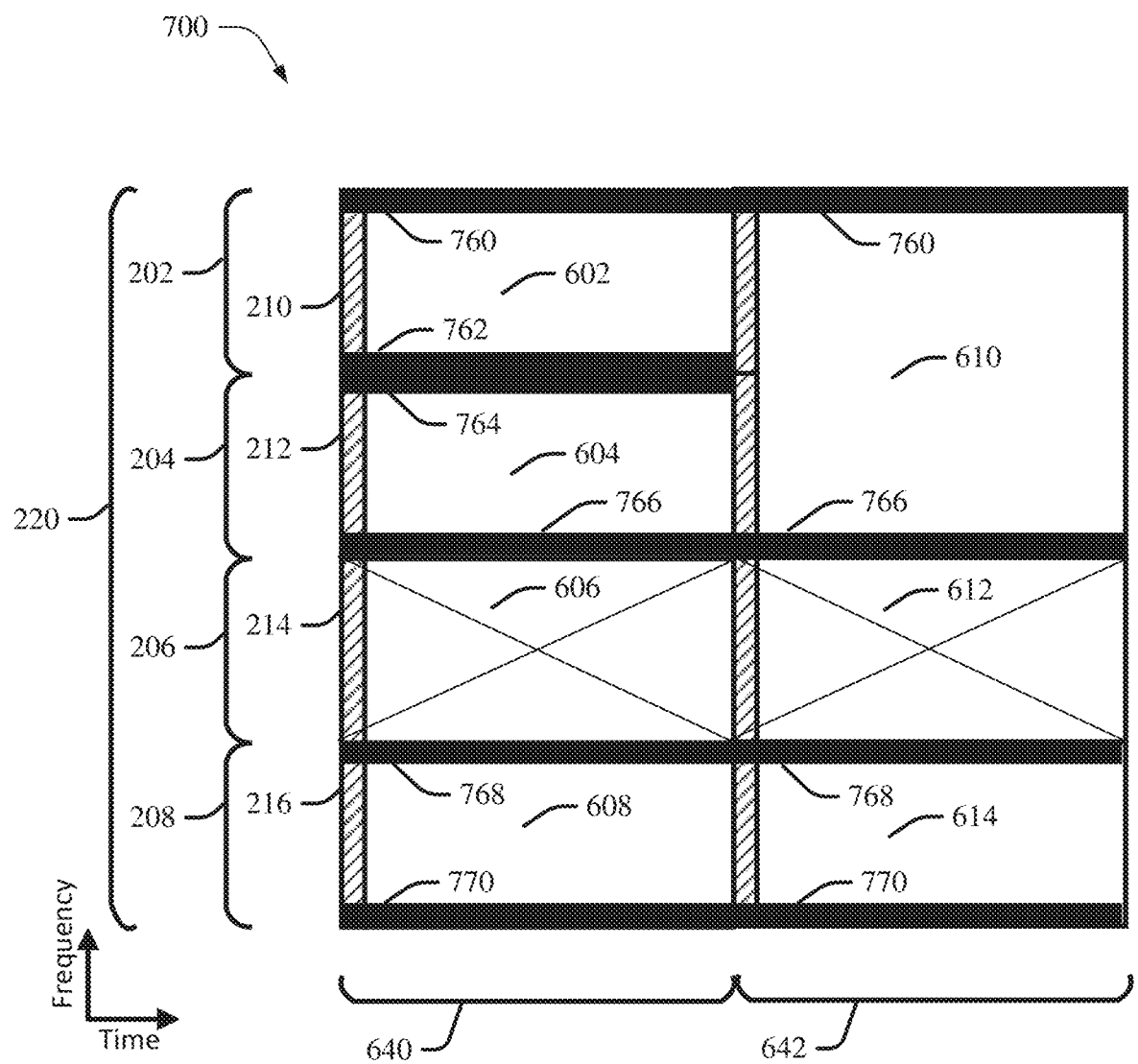
FIG. 7 illustrates an example of a NR with single serving cell in an unlicensed spectrum in accordance with various aspects and embodiments described herein.

Referring now to FIG. 7, illustrated is an example of a NR system with single serving cell in an unlicensed spectrum 700 in accordance with various aspects and embodiments described herein. Repetitive description of like elements employed in other embodiments described herein is omitted for sake of brevity. In some embodiments, every subband that is available for transmission, for example, subband 202, 204 and 208, a pair of guard bands are provided, one at each edge. According to the exemplary illustration, subband 202 comprises a pair of guard bands 760 and 762 located at the edge, subband 204 comprises a pair of guard bands 764 and 766 located at the edge, and subband 208 comprises a pair of guard bands 768 and 770 located at the edge. When there are two adjacent subbands 202 and 204 available for transmission, there exists a pair of adjacent guard bands 762 and 764. In some embodiments, the guard bands are 760, 764, 766, 768 and 770 are placed at the edges of subbands and generally occupy 5% of the subband bandwidth. Thus, a total for up 10% of the bandwidth is allocated to prevent leakage. These number, however, serve as example and ought not be construed in a limiting sense.

In some embodiments, when determined that adjacent subbands 202 and 204 are available for transmission, the transmitter and receiver may change their behavior in order to eliminate the adjacent guard bands 762 and 764 for future time slots (for example 642) in order to utilize the maximum bandwidth possible. By eliminating the adjacent guard bands 762 and 764 (e.g., portion 610), the bandwidth/frequency occupied by the adjacent guard bands can be utilized to transmit essential data to the receiver, for example, but not limited to, user data, payload data, channel data, signal data (e.g., any data that a receiver can utilize). In one embodiment, eliminating the adjacent guard bands 762 and 764 frees up the frequency to transmit portion of user data or any essential information used by the receiver during the guard time (e.g., a portion where the guard band was used to prevent leakage). For example, the receiver and transmitter may use passband filters per contiguous group of idle LBT subbands 202 and 204 rather than per LBT subband as illustrated for the second slot 642. This eliminates the guard bands 762 and 764 between subbands 202 and 204 thereby increasing spectral efficiency and throughput.

In some embodiments, the COT structure in frequency domain is indicated to the UE explicitly. For example, a bitmap of length corresponding to the number of LBT subbands can indicate to the UE which LBT subband is idle and occupied. For example, the n-th bit in the bitmap may correspond to the n-th LBT subband whereby n=1 corresponds to the LBT subband with the lowest center frequency, n=2 corresponds to the LBT subband with the second lowest center frequency, and so forth. If the n-th bit is one, the UE sets its bandpass filter such that the n-th subband is in its passband, otherwise, if the n-th bit is zero, the UE sets its bandpass filter such that the n-th subband is in its stopband whereby the passbands are continuous within a set of contiguous subbands that are idle. In the example in FIG. 7, the signaled bitmap would thus be [1 0 1 1] and there would not be a guard interval in frequency domain between subbands 202 and 204 in the second slot 642 unlike the first slot 640.

Such explicitly indication can happen in a group-common way using a GC-PDCCH or in a UE specific way using a PDCCH. For example, a GC-PDCCH transmitted at the beginning of a COT in slot 640, specifically in one or more of subbands 202, 204, 206 and 208 (PDCCH regions 210, 212, 214, 216 respectively) may indicate the frequency domain structure of the COT according to the embodiments herein. When the UE monitors for the GC-PDCCH, it sets its bandpass filters with passbands per LBT subbands resulting in guard bands between each LBT subband as depicted in FIG. 7 in the first slot 640. Transmissions in the first slot of a COT 640 thus cannot span the entire LBT subband. After the UE decodes the GC-PDCCH and detects the beginning of COT, for subsequent slots 642 . . . in the COT, it sets its bandpass filters according to the embodiments herein, e.g., using the bitmap in the GC-PDCCH it sets its bandpass filters such that passbands span contiguous sets of LBT subbands that are idle thereby avoiding unnecessary guards between adjacent idle LBT subbands. Note that the length of the COT may also be indicated in the GC-PDCCH such that the UE knows when to revert to per LBT subband filtering and mapping of signals and channels at the beginning of a new COT.

In some embodiments, the beginning of a COT is not indicated to the UE by a group-common channel or signal such as the GC-PDCCH. Rather, each PDCCH scheduling a PDSCH or triggering a reference signal transmission indicates the UE behavior in regard to filtering and mapping. In order for the UE to change its filtering behavior, the PDCCH and corresponding PDSCH or reference signal are separated in time. For example, a PDSCH or reference signal scheduled/triggered within the same slot uses per LBT subband filtering/mapping whereas a PDSCH or reference signal scheduled/triggered for the next slot uses filtering/mapping according to the embodiments herein. This allows the UE to change its filters between the scheduling/triggering PDCCH and the reception of the scheduled/triggered channel/signal.

In some embodiments, implicit signaling of the COT structure in frequency domain is used. Instead of explicitly signaling a bitmap the receiver constructs said bitmap implicitly by the following procedure: If a signal/channel indicating the beginning of a COT is detected/decoded in the n-th LBT subband the receiver assumes the n-th bit of the bitmap is 1. Otherwise, it assumes the n-th bit is zero.

In some embodiments, the duration of time slots 640 and 642 does not correspond to one slot but rather a given number of OFDM symbols.

In some embodiments, there may be a guard time between the first slot and the second slot to allow UE(s) to switch RF filtering. In some embodiments, the guard time may not contain control or data meant for the UE. Although not shown in the figures, a guard time may be at edge of timeslot, wherein a portion of user data is sent in the first slot and a portion is sent in the second slot and onwards after a guard time (between the first and second slot). No receiver essential information is contained in this guard time.

In some embodiments, the explicit signaling of the bitmap either via a GC-PDCCH or PDCCH according to the embodiments herein is license assisted. In License Assisted Access (LAA), a UE is configured with carriers in unlicensed spectrum and licensed spectrum. Use of licensed spectrum is exclusively, hence, the concept of LBT and LBT subbands does not apply. The transmitter can transmit in licensed spectrum without a CCA procedure. In LAA, the GC-PDCCH or PDCCH indicating the frequency structure of the COT can be signaled from the licensed carrier whereby the UE receives the indication on a first licensed carrier but applies the associated UE behavior (bandpass filtering, mapping of signals/channels, etc.) on a second carrier 220 in unlicensed spectrum. The embodiments herein are described from the downlink perspective of a cellular communications system, i.e., transmitter and base station are used interchangeably. Likewise, receiver and UE are used interchangeably. This is for ease of exposition and ought not to be construed in a limiting sense.

In some embodiments, a given UE can receive at most one data transmission per slot 640 or 642. The data is transmitted by a single contiguous PDSCH. Said PDSCH (e.g., 602) could be mapped to a single LBT subband (e.g., 202) in the first slot of a COT 640, said PDSCH (e.g., 614) could be mapped to a single LBT subband (e.g., 208) in the second slot of a COT 642, or said PDSCH (e.g., 610) could be mapped to multiple LBT subbands (e.g., 202 and 204).

In some embodiments, a given UE can receive more than one data transmission per slot 640 or 642. The data is transmitted by a single PDSCH which may or may not be contiguous. The single PDCCH is scheduled by a single downlink control information (DCI) transmitted using a single PDCCH. For example, said single PDSCH may contain a plurality of codewords, whereby each codeword is mapped to a single set comprising one or more contiguous LBT subbands. For example, a single PDSCH comprising two codewords could be mapped to LBT subbands 202, 204 and 208 whereby a first codeword 610 is mapped to a first set of contiguous LBT subbands 202 and 204 and whereby a second codeword 614 is mapped to a second set of contiguous LBT subbands 208.

In some embodiments, a given UE can receive more than one data transmission per slot 640 or 642. The data is transmitted using a plurality of PDSCH. Each PDSCH is scheduled by its own separate DCI carried by its own separate PDCCH. For example, a first PDSCH 610 is transmitted in LBT subbands 202 and 204 and is scheduled by a first DCI transmitted by a first PDCCH. A second PDSCH 614 is transmitted in LBT subband 208 and is scheduled by a second DCI transmitted by a second PDCCH.

In some embodiments, the COT may be shared between a gNB and one or more UEs. A shared COT means that one transmitter imitates the COT, usually by means of a CCA procedure using LBT, whereas another transmitter may also transmit within the same COT either without using a CCA procedure by itself or, alternatively, using a modified CCA procedure for transmitters that do not initiate COTs within which they transmit. In case of a shared COT, a UE that has not initiated the COT but transmits within it, sets its filters and maps channels/signals according to the embodiments herein. For example, a UE may set its filters according to the embodiments herein for reception from a gNB that has initiated a COT. Within the duration of the gNB initiated COT, the duplex direction switches from downlink to uplink making the UE the transmitter and the gNB the receiver. UE and gNB, now with reversed roles (gNB is the receiver, UE the transmitter) continue to use the same filtering as before for slots 642 other than the first slot of the COT when transmitting and receiving, respectively. A gNB may schedule a UE within a gNB initiated COT regardless of whether said UE first receives data from said gNB. The embodiments herein, indicating the frequency domain structure of the COT and the associated UE behavior in regard to filtering and mapping of channels/signals can be used by said scheduled UE for its transmission regardless of whether said UE has first received data from the scheduling gNB in the same COT.

Figure 8:
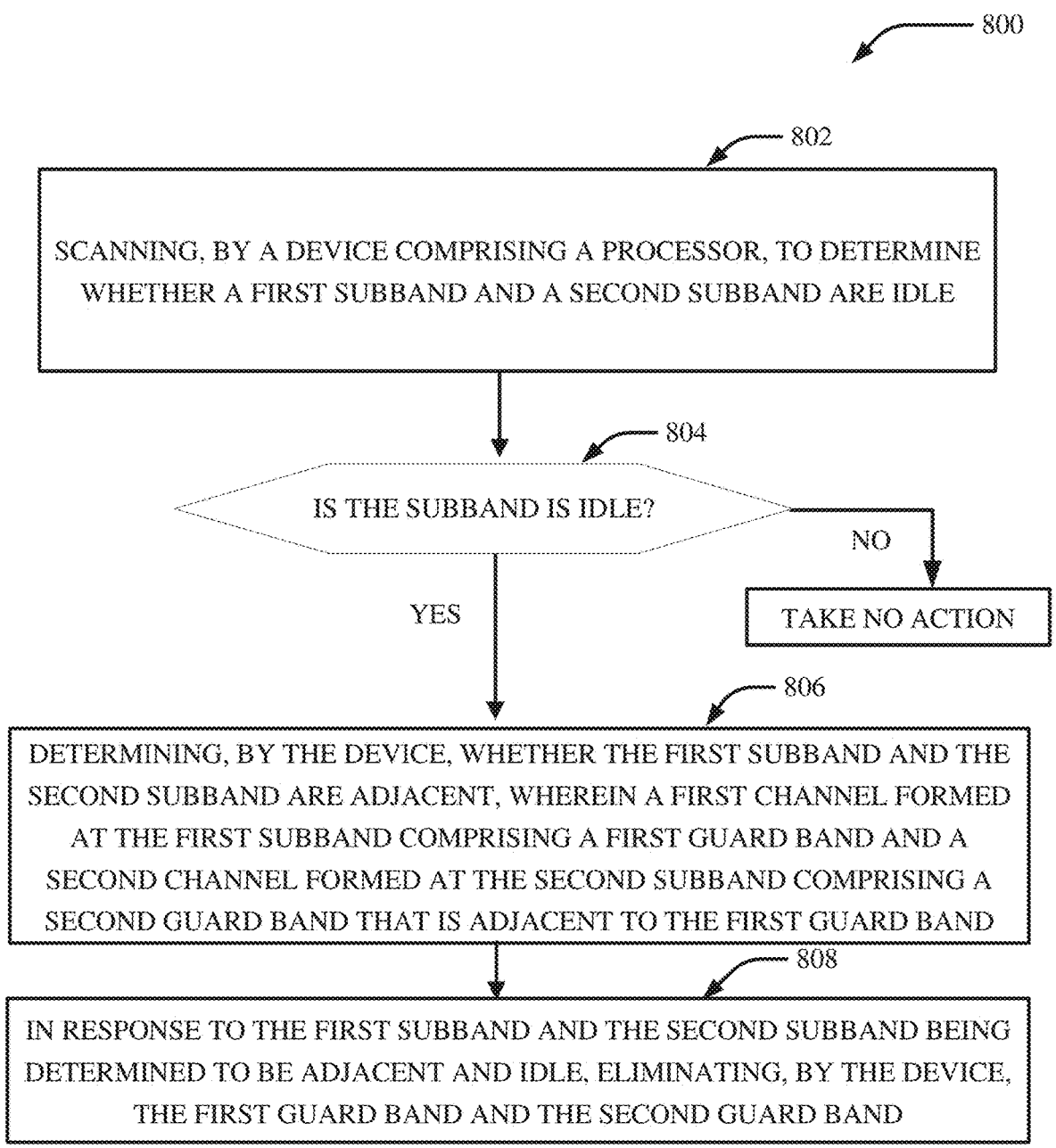
FIG. 8 depicts a diagram of an example, non-limiting computer implemented method that facilitates a discontinuous access to unlicensed spectrum in a new radio access system in accordance with one or more embodiments described herein.

FIG. 8 depicts a diagram of an example, non-limiting computer implemented method that facilitates a discontinuous access to unlicensed spectrum in a new radio access system in accordance with one or more embodiments described herein. Repetitive description of like elements employed in other embodiments described herein is omitted for sake of brevity. In some examples, flow diagram 800 can be implemented by operating environment 1100 described below. It can be appreciated that the operations of flow diagram 800 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts scanning, by a device comprising a processor, to determine whether a first subband and a second subband are idle (e.g., determine is the subband is available for transmission). Operation 804 depicts determining if subband is idle (e.g., available for transmission of user defined data, channel data or signaling data), then perform operation 806. Otherwise, take no action and continue monitoring the connection. Operation 806 depicts determining, by the device, whether the first subband and the second subband are adjacent, wherein a first channel formed within the first subband comprising a first guard band and a second channel formed within the second subband comprising a second guard band that is adjacent to the first guard band. Operation 808 depicts in response to the first subband and the second subband being determined to be adjacent and idle, eliminating, by the device, parts of the first guard bands and parts of the second guard bands (e.g., if the subbands are adjacent, then remove the parts of the guard bands that are not at the edge of the adjacent subbands and utilize both subbands entirely (except at the edge of the contiguous set of subbands) to transmit data instead of reserving the frequency guard band). The advantage is that additional bandwidth can be available to use for transmitting various data, that is not guard data, including, but not limited to user defined data, payload data, signaling data, channel data.

Figure 9:
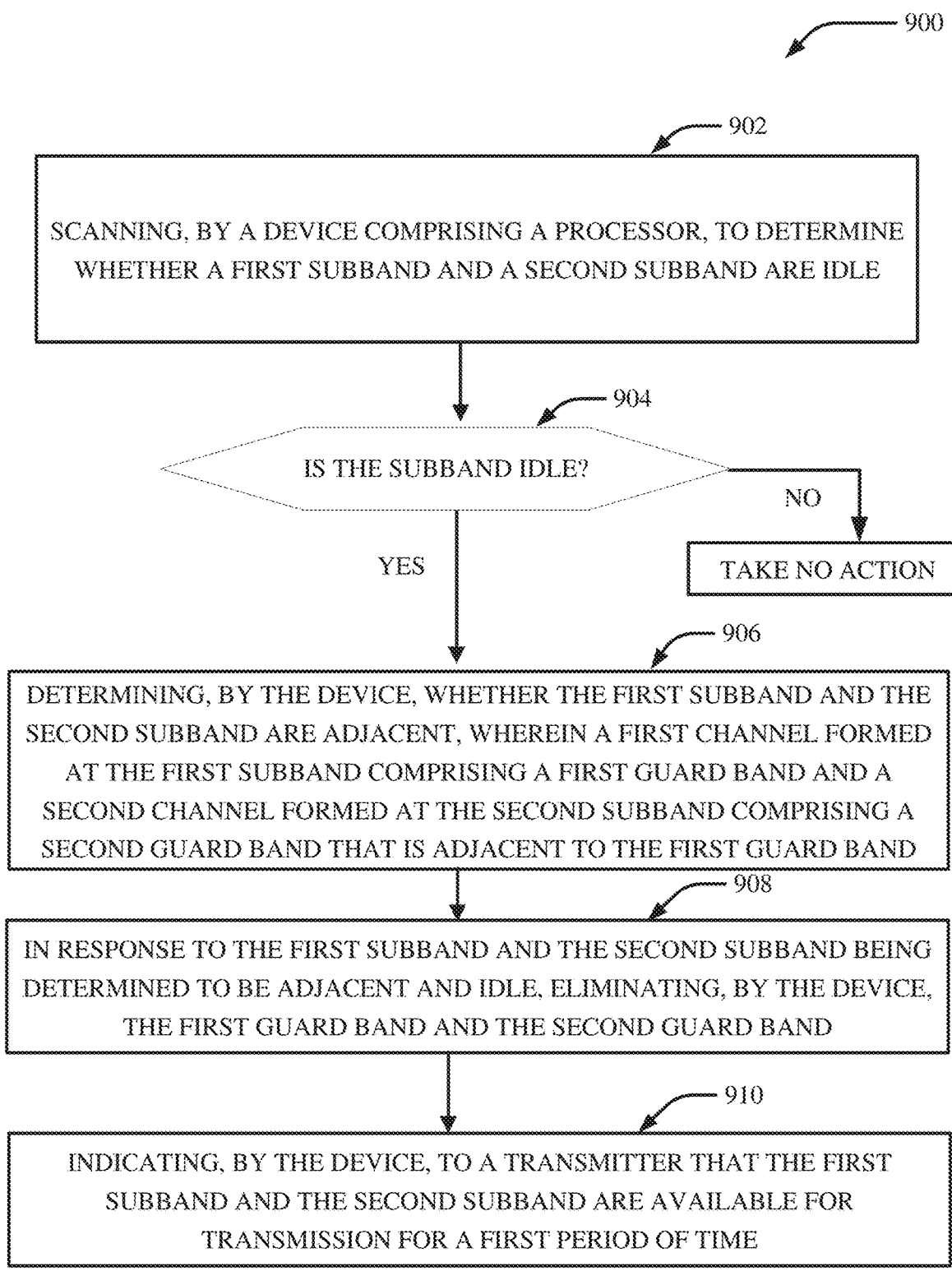
FIG. 9 depicts a diagram of an example, non-limiting computer implemented method that facilitates a discontinuous access to unlicensed spectrum in a new radio access system in accordance with one or more embodiments described herein.

FIG. 9 depicts a diagram of an example, non-limiting computer implemented method that facilitates a discontinuous access to unlicensed spectrum in a new radio access system in accordance with one or more embodiments described herein. Repetitive description of like elements employed in other embodiments described herein is omitted for sake of brevity. In some examples, flow diagram 900 can be implemented by operating environment 1100 described below. It can be appreciated that the operations of flow diagram 900 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts scanning, by a device comprising a processor, to determine whether a first subband and a second subband are idle (e.g., determine is the subband is available for transmission). Operation 904 depicts determining if subband is idle (e.g., available for transmission of user defined data, channel data or signaling data), then perform operation 906. Otherwise, take no action and continue monitoring the connection. Operation 906 depicts determining, by the device, whether the first subband and the second subband are adjacent, wherein a first channel formed within the first subband comprising a first guard band and a second channel formed within the second subband comprising a second guard band that is adjacent to the first guard band. Operation 908 depicts in response to the first subband and the second subband being determined to be adjacent and idle, eliminating, by the device, parts of the first guard bands and parts of the second guard bands (e.g., if the subbands are adjacent, then remove the parts of the guard bands that are not at the edge of the adjacent subbands and utilize both subbands entirely (except at the edge of the contiguous set of subbands) to transmit data instead of reserving the frequency guard band). The advantage is that additional bandwidth can be available to use for transmitting various data, that is not guard data, including, but not limited to user defined data, payload data, signaling data, channel data. Operation 910 depicts indicating, by the device, to a transmitter that the first subband and the second subband are available for transmission for a first period of time. The advantage is that all future communication (e.g., time slot 642 and beyond) using the two adjacent subband will transmit data without the middle guard bands (e.g., 762 and 764).

Figure 10:
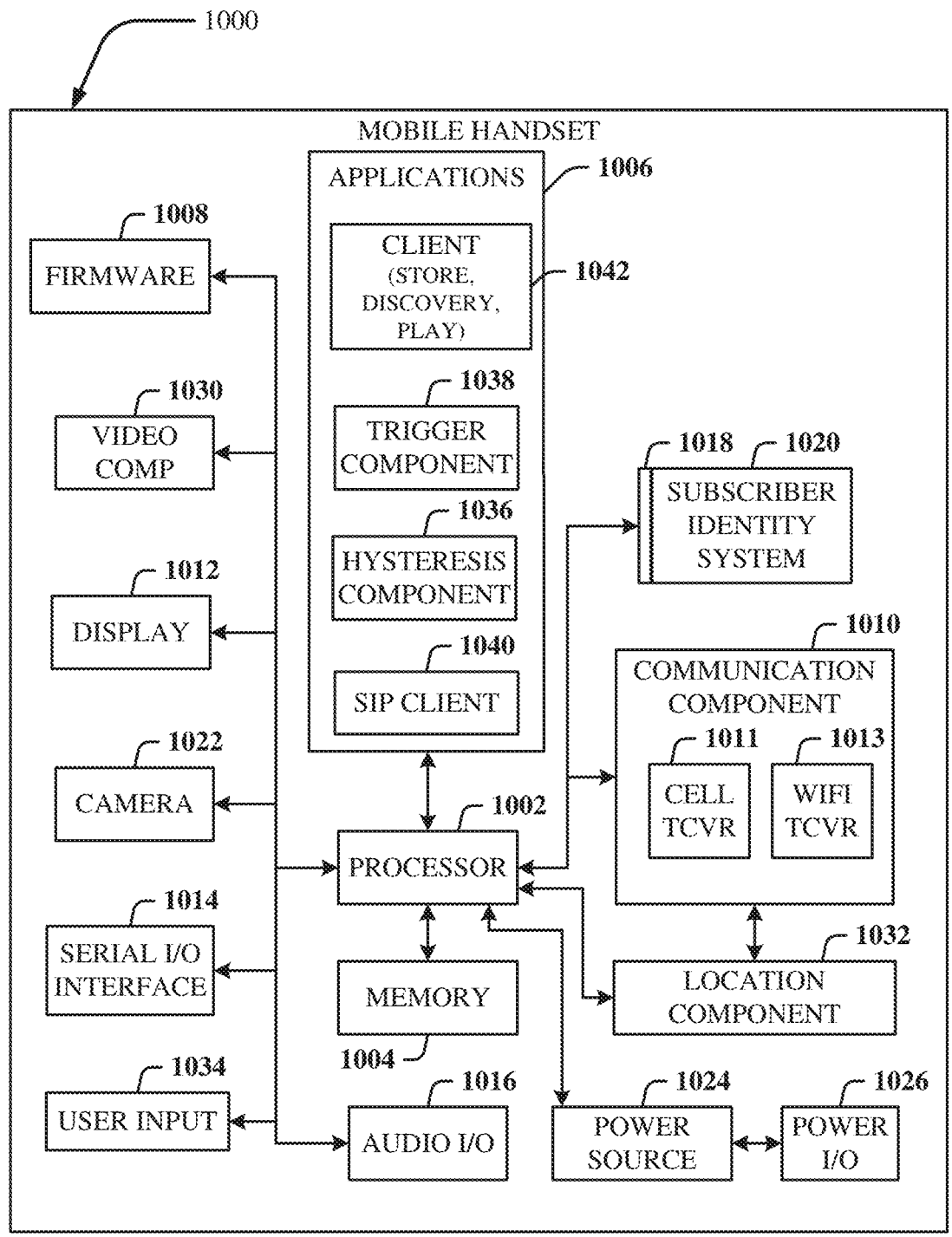
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hard-wire connection, and other serial input devices (e.g., a keyboard, keypad, and mouse). This can support updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touchscreen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
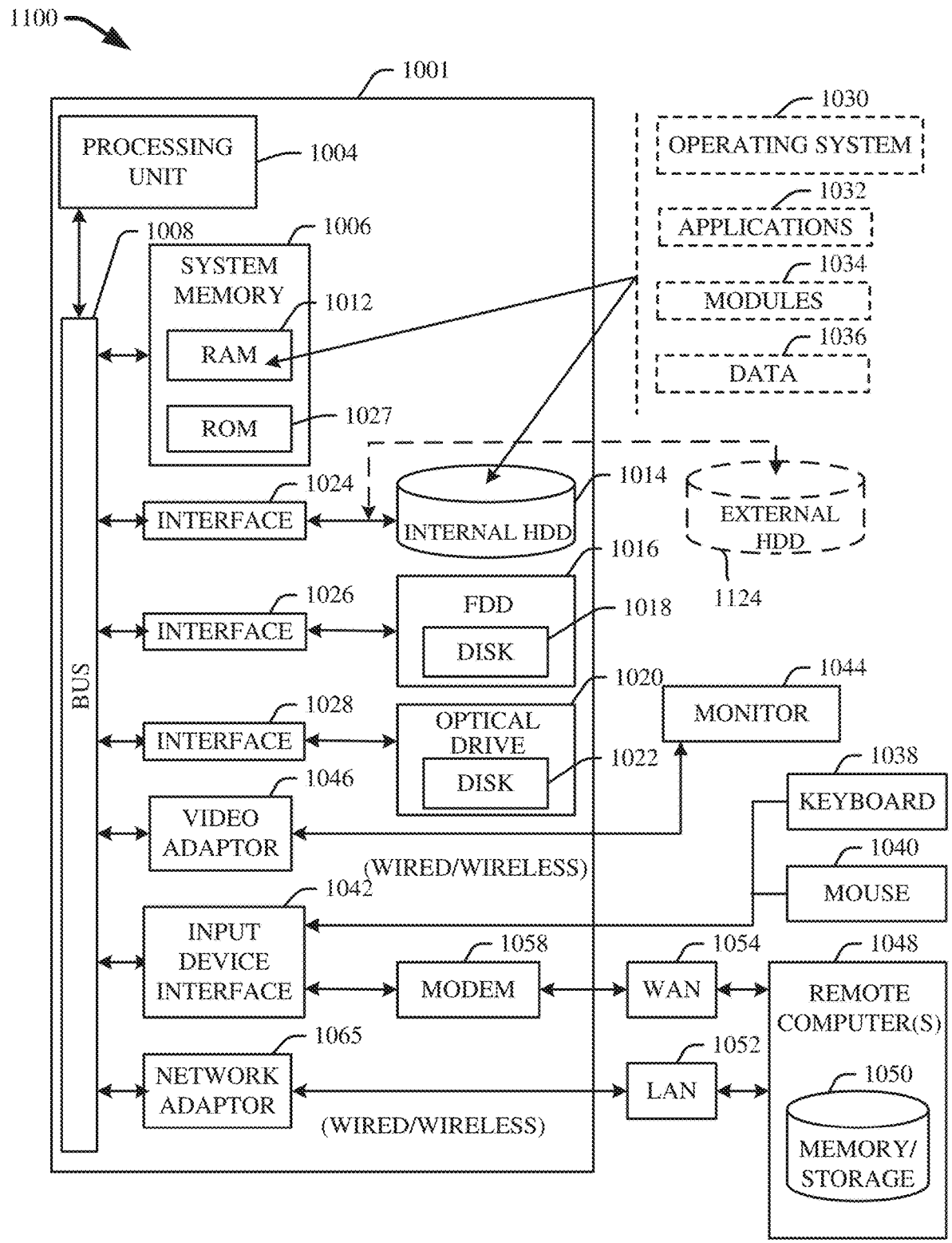
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

In order to provide a context for the various aspects of the disclosed subject matter, FIG. 11 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1100, which can be, for example, part of the hardware of system 1120, includes a processing unit 1114, a system memory 1106, and a system bus 1118. System bus 1118 couples system components including, but not limited to, system memory 1106 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1106 can include volatile memory 1120 and nonvolatile memory 1122. A basic input/output system (BIOS), containing routines to transfer information between elements within computer 1100, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM 1112, which acts as external cache memory. By way of illustration and not limitation, RAM 1112 is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1100 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer 1100. System applications 1130 take advantage of the management of resources by operating system 1128 through program modules 1132 and program data 1134 stored either in system memory 1106 or on disk storage 1124. It is to be noted that the disclosed subject matter can be implemented with various operating systems or combinations of operating systems.

A user can enter commands or information into computer 1100 through input device(s) 1136. As an example, a mobile device and/or portable device can include a user interface embodied in a touch sensitive display panel allowing a user to interact with computer 1100. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 and a move use some of the same type of ports as input device(s) 1136.

Thus, for example, a USB port can be used to provide input to computer 1100 and to output information from computer 1100 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1100 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1100.

For purposes of brevity, only a memory storage device 1146 is illustrated with remote computer(s) 1144. Remote computer(s) 1144 is logically connected to computer 1100 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1100, it can also be external to computer 1100. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

Performing aggregation above the RLC makes it possible to perform the routing and aggregation at the same protocol sublayer. Thus, additional possibilities in terms of taking into account routing information while performing bearer aggregation can be used to facilitate a more efficient system. Additionally, it also reduces the impact on standards for lower protocol stack layers. Similarly, the benefits of performing aggregation below the RLC are that it can reduce the demand for LCID space extension when trying to support 1:1 mapping of UE bearers to backhaul channels.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, comprising:
identifying, based on a first energy value associated with a first subband being determined to be less than a detection threshold value and a second energy value associated with a second subband being determined to be less than the detection threshold value, that the first subband is idle and that the second subband is idle;
determining, based on a defined spectral mask, that a first guard band associated with the first subband is adjacent to a second guard band associated with the second subband; and
forming, based on the first guard band being determined to be adjacent to the second guard band, a modified subband comprising the first subband and the second subband, wherein the modified subband is used to transmit data.

2. The system of claim 1, wherein the modified subband comprises a third guard band, and wherein the third guard band abuts a fourth guard band associated with a third subband.

3. The system of claim 2, wherein the third subband is associated with a third energy value that is greater than the detection threshold value.

4. The system of claim 1, wherein the identifying of the first energy value is performed during a defined channel occupying time period.

5. The system of claim 1, wherein the identifying of the second energy value is performed during a maximum channel occupying time period.

6. The system of claim 5, wherein the maximum channel occupying time period defines a time slot associated with the first subband and the second subband.

7. The system of claim 5, wherein the operations further comprise transmitting the data during the maximum channel occupying time period.

8. The system of claim 1, wherein the determining that the first guard band is adjacent to the second guard band is performed during a first slot period defined by a maximum channel occupying time period.

9. The system of claim 8, wherein the operations further comprise transmitting the data using the modified subband during a second slot period defined by the maximum channel occupying time period.

10. A method, comprising:
in response to detecting that a first energy value associated with a first subband is less than a detection threshold value and that a second energy value associated with a second subband is less that the detection threshold value, determining, by serving equipment comprising a processor, that the first subband and the second subband are idle;
determining, by the serving equipment, that a first guard band associated with the first subband is adjacent to a second guard band associated with the second subband; and
joining, by the serving equipment, the first suband and the second suband to create a modified subband, wherein the modified subband is used to transmit data.

11. The method of claim 10, wherein the modified subband comprises a third guard band that is contiguous with a fourth guard band associated with a third subband.

12. The method of claim 11, wherein the third subband is associated with a third energy value that exceeds the detection threshold value.

13. The method of claim 10, wherein the identifying of the first energy value is performed during a maximum channel occupying time period.

14. The method of claim 13, wherein the identifying of the second energy value is performed during a channel occupying time period.

15. The method of claim 14, wherein the maximum channel occupying time period defines a time slot associated with the first subband and the second subband.

16. The method of claim 14, further comprising transmitting, by the serving equipment, the data during the channel occupying time period.

17. The method of claim 10, wherein the determining that the first guard band is adjacent to the second guard band is performed during a first slot period defined by a maximum channel occupying time period.

18. The method of claim 17, further comprising sending, by the serving equipment, the data using the modified subband during a second slot period defined by the maximum channel occupying time period.

19. A non-transitory machine-readable medium, comprising executable instructions that, when executed by a processor, facilitate performance of operations, comprising:

determining that a first energy value associated with a first subband is less than a detection threshold value;

determining that a second energy value associated with a second subband is less that the detection threshold value;

determining that the first subband and the second subband are idle;

determining that a first guard band associated with the first subband is contiguous with a second guard band associated with the second subband; and using the first subband and the second subband as a modified subband to transmit data.

20. The non-transitory machine-readable medium of claim 19, wherein a maximum channel occupancy time period for a transmission of the data is communicated to transmitting equipment as a bitmap of a defined length, and wherein the defined length of the bitmap is representative of a grouping of subbands comprising the first subband and the second subband.

* * * * *